Figure 3:
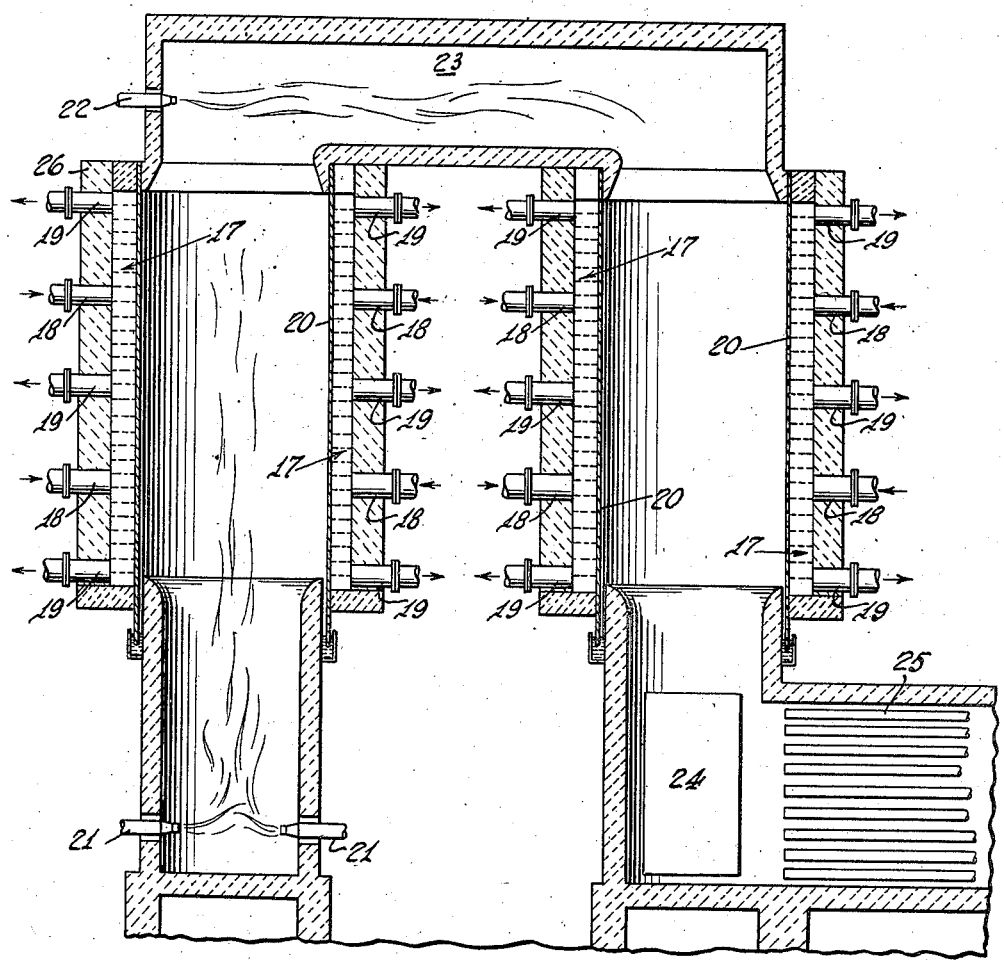

April 2, 1946.  R. WITKIEWICZ  2,397,899
PROCESS AND APPARATUS FOR PERFORMING ENDOTHERMIC
CATALYTIC REACTIONS IN THE GAS PHASE
Filed March 30, 1939  2 Sheets-Sheet 1
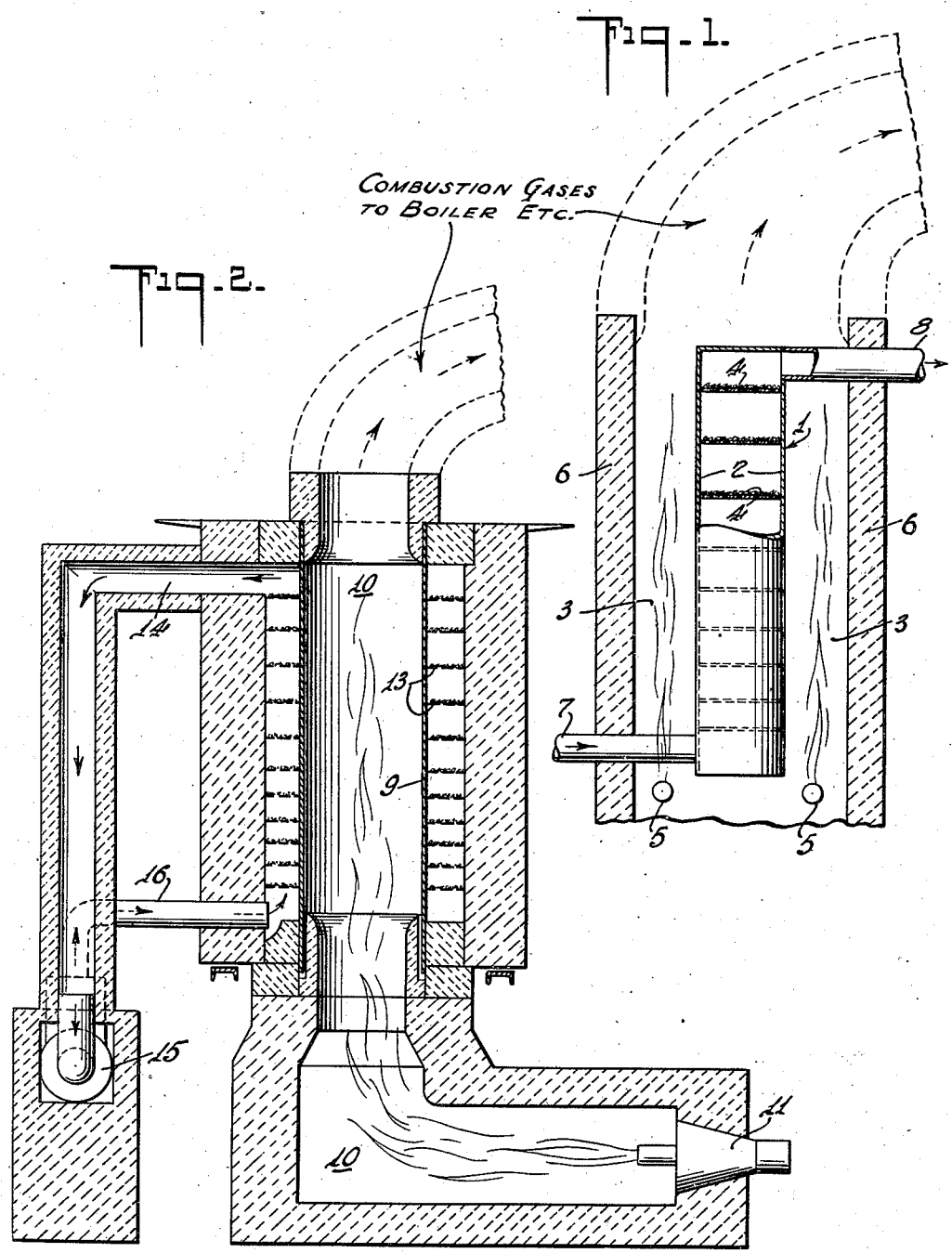
INVENTOR
Roman Witkiewicz
BY
ATTORNEY Patented Apr. 2, 1946

2,397,899

UNITED STATES PATENT OFFICE 2,397,899

PROCESS AND APPARATUS FOR PERFORMING ENDOTHERMIC CATALYTIC REACTIONS IN THE GAS PHASE

Roman Witkiewicz, Lwow, Poland; vested in the Alien Property Custodian

Application March 30, 1939, Serial No. 264,995

7 Claims. (Cl. 23—1)

This invention relates to surface reactions and more particularly to catalytically induced chemical reactions which occur with substantial conversion between heat and chemical energy.

Chemical reactions between gases or vapors occur very often with endo-thermic effects. In many cases these effects are very serious and cause difficulties in keeping the temperature of the reaction at the desired level.

The amount of heat which has to be delivered to assure the uniformity of the process increases per unit of time and space in proportion to the increased velocity of the reaction in the presence of catalysts. The catalyst mass cools off irregularly. In case of endo-thermic reactions, if the heat supply is not satisfactory, the temperature drops and consequently also the rate of reaction drops; the reaction is not completed and sometimes even changes the desired trend.

The apparatus used at present for endo-thermic catalytic reactions in the gas-phase can be divided into two types with respect to the principles by which the heat is delivered for the reaction. The first type is based on an intermittent cycle of operation. A solid material, which usually serves also as a catalyst, is heated directly by combustion gases to the desired temperature; then in the next cycle it is used for the reaction until the temperature drops below a certain minimum. This intermittent operation is disadvantageous for reasons of low heat economy, relatively low capacity and contamination of the reaction products. In the second type of apparatus the heat is delivered continuously. The catalyst fills a space separated from the heating medium by walls, to which it is closely adjacent. Only this layer of the catalyst which is close to the heated wall receives enough heat; layers placed at further distances are at lower temperatures due to insufficient heat transfer into the catalyst mass.

One object of the present invention is to provide an efficient apparatus and process for performing endo-thermic catalytic reactions in the gas-phase, and wherein the temperature of reaction is controlled by efficient heat-exchange with substantially the entire surface of the catalyst.

Another object is to provide an apparatus where the reacting gases can mix freely and pass through a number of layers of the catalyst without channelling.

Still another object is to provide an apparatus where the catalyst is used in thin layers and substantially at constant temperatures thus preventing mechanical deterioration.

Another object is to provide an apparatus giving high out-put per unit of catalyst used, thus permitting the economical use of relatively expensive catalysts and, if desired, a frequent change of catalyst.

These objects I accomplish by using a catalyst in relatively thin layers and effecting heat exchange by direct radiation to its surface at which reaction occurs.

The apparatus according to this invention is represented schematically in the accompanying drawings in which each of the Figures 1, 2 and 3 is a view in vertical section, more or less diagrammatic, of an apparatus embodying my invention adapted for endo-thermic catalytic reactions such as water-gas production.

The apparatus (Figure 1) has a reaction chamber 1 separated by a wall 2 from the heating space 3. The reaction chamber contains perforated trays placed at a distance from each other. On these trays is placed the catalyst in a rather thin layer 4. At the bottom of the heating space 3 are placed burners 5 fed by liquid or gaseous fuel. The heating space is insulated by an external insulating wall 6. Combustion gases may be used in preheating steam or in preheating gases entering the reaction chamber, or in heating a boiler. Gases for the reaction enter the reaction chamber 1 through a conduit 7 and leave through conduit 8 or they can be passed in reverse direction, counter-current to the flame. Reaction gases may be used directly when hot for further processing or can serve as a preheating medium for incoming gas. The distances between the trays and the thickness of the catalyst layers are suitably selected so that between the surface of the catalyst layer and the next upper tray there remains a rather large free space. The thickness of the catalyst layer can vary depending primarily on the activity and the size of the catalyst grain, its conductivity, as well as such factors as, e. g., operating temperatures, the rate and the degree of endo-thermicity of the reaction and the amount of heat delivered by radiation of the wall to the unit of surface of the catalyst. These and other factors influence the thickness of the catalyst within a wide range. In most cases the thickness of the catalyst layers will range from ¼ to 2 inches but these figures are cited only as examples, and it is obvious that the thickness can vary within wider figures and the catalyst layer can be thinner or thicker without departing from the spirit of the invention.

Free spaces between catalyst layers are very important because these free spaces enable the heat to radiate from the heated walls of the chamber upon the surface of the catalyst and also to mix the gases of reaction. Generally the free spaces of the reaction chamber should be much larger than the spaces occupied by the catalyst.

The reaction chamber can have any suitable shape, e. g. a cylinder, a prism or a cone. Its walls are made of steel, or a special heat-resistant alloy or refractory ceramic material, depending upon the required temperature of reaction. The walls of the chamber are heated externally by any suitable means, e. g., liquid or gaseous fuel, and serve to radiate the heat or to transmit radiant heat to the catalyst and the reacting gases.

When a material which is relatively impermeable to radiant heat is used, the wall of the chamber itself must be heated to a temperature at which it becomes a good radiant source well above the required temperature at the surface of the catalyst. If, however, a material is used which is highly permeable to infra-red radiation, as for example silica or certain refractory glasses, etc., the wall of the reaction chamber may remain relatively cool, e. g., at the optimum reaction temperature, while transmitting radiant heat from a flame, hot gases or liquid or from a radiating body outside the chamber.

The main amount of heat is furnished by radiation from or through the hot wall to the catalyst surface directly or by reflexion. Comparatively, only a negligible amount of heat is furnished to the inner zones of the catalyst by conductivity. This fact shows the advantage of using the catalyst in thin layers exposing a large irradiated surface. This way a uniform distribution of heat in the catalyst mass, especially at the surface where it is required for the reaction, and high performance of the catalyst are obtained.

The reaction chamber can also be shaped in another very advantageous form, namely, as an annular space between two concentric cylinders. The heating is done within the inner cylinder. The wall of the outer cylinder of the reaction chamber serves for heat reflexion and insulation purposes; or additional heat radiation may be supplied through the outer walls.

This form of apparatus permits the use of a central flame, avoiding difficulties of shaping and regulating the burners around a cylindrical reaction chamber, and also further improves the thermal efficiency of the apparatus. The analysis of the radiant-heat-transfer from an outer jacket (wall) to the catalyst in an inner chamber has shown that in the optimum case the amount of heat transferred from the external jacket to the catalyst trays is equal to that amount which could be radiated from the jacket to a parallel wall having a surface equal to the surface of the jacket and having a temperature equal to the temperature of the catalyst. This fact, resulting from the laws of radiant-heat-transfer, constitutes a limitation on the efficiency of the apparatus described in the earlier part of the application as compared with an apparatus where the reaction space has an annular form and is heated from the interior.

In Figure 2 a diagrammatic form of the preferred apparatus is shown. The inner jacket 9 is heated from the interior by a single flame 10 which is easy to handle and regulate. This flame can be obtained by means of one or many burners 11, depending upon the size of the apparatus. The apparatus has an outside wall 12 made, e. g., from ordinary sheet-iron and masonry work of ceramic insulating material. The catalyst is placed in layers or trays 13 in the annular reaction space between the inner jacket 9 and the outer wall of the apparatus 12. The catalyst is heated by the radiation of the inner jacket, which radiates either directly on the catalyst and/or by reflexion from, e. g., the outer wall. It can be noticed that the catalyst layer is in this case very thin and large empty spaces provide ample opportunity for radiation from or through the heated wall 9 to all parts of the surface of the catalyst layer.

Reaction gases leave the reaction space by conduit 14 and in a heat-exchanger 15 serve to preheat gases for the reaction, which preheated gases then enter the reaction space by conduit 16. Any gas-tight device, e. g., liquid seal or bellows, etc., can be used to take care of expansions or contractions of the radiating jacket 9.

In this preferred shape of apparatus as shown a more intense heat transfer to the catalyst is attained by designing the outer wall and/or its heat insulating cover to reflect the major part of the heat back on the catalyst. In this way either higher temperature of the catalyst can be obtained or more gas per reaction-volume can be passed. By increase of the outer radius of the apparatus, while simultaneously maintaining the ratio of the radiating area of the inner jacket to the irradiated area of the catalyst layer, the catalyst can be advantageously distributed in very thin layers, which assists in achieving uniform heating of its mass.

In case of a gas fuel it is advantageous to use visible flame enabling a more uniform distribution of the temperature on the whole length of the apparatus.

As the heat transfer of the apparatus of my invention is based on radiation it is especially suitable for endo-thermic reactions occurring at elevated temperatures, e. g., reactions of dehydrogenation or isomerization or the conversion of hydrocarbons and steam into water-gas mixtures. Natural gas or refinery cracking gases can be converted with steam into water-gas of high hydrogen-content. Also other gases like blue gas can have their methane component converted to a large extent to carbon-monoxide and hydrogen. Any catalyst or combinations thereof of one or more catalysts with promoters and carriers suitable for the contemplated reaction can be used in this apparatus, e. g., iron, nickel, cobalt, copper, in metallic form or oxides or natural ores or salts, alumina, compounds of chromium, thorium, silicium, cerium, vanadium, tungsten, zinc, tin, lead, cadmium, manganese, molybdenum, sodium, potassium and boron. They can be used by themselves or deposited or intimately mixed with carriers of acid, alkaline or neutral character, such as siliceous materials, porcelain, kieselguhr, pumice, silica-gel, natural or artificial zeolites, alumina, bauxite, magnesia, slag, calcium oxide or silicate, barium carbonate, active carbon and the like.

The efficiency of the catalyst is very high, especially when used in very thin layers; therefore, even expensive catalysts can be used such as, e. g., silver, platinum, palladium, rhodium, gold, beryllium and rhenium.

As the catalyst is maintained in a thin layer in a rather constant temperature, the requirements as to its mechanical strength can be neglected in favor of its activity; therefore, highly activated catalysts can be useful though they might have only a low mechanical resistance.

Most of the catalysts referred to above can be used either in the water-gas reaction or in the reactions of dehydrogenation or isomerization. For example, ethane, propane, butanes and similar hydrocarbons can be converted either alone or with additions of steam or carbon dioxide into mixtures containing large proportions of unsaturated hydrocarbons, which subsequently can be useful in polymerizing them into liquid motor-fuels. In case of reactions producing deposits of carbon on the trays or causing a poisoning of the catalyst, the operation can be periodically interrupted and steam or air or their mixtures can be passed to revivify the catalyst.

Figure 3 shows diagrammatically an example of a large unit of the preferred type for conversion of natural gas with steam into water-gas. This unit is composed of two cylindrical apparatus, each about 30 feet high and 10 feet in diameter producing about three million cubic feet of water gas daily. Relatively large diameter is desirable since the capacity increases more than proportionally to the diameter. In the annular reaction spaces 17 granular iron ore is used as a catalyst and is distributed in thin layers on trays. The annular reaction space is divided by perforated trays into annular compartments averaging about 3¼ inches high and 6 inches wide. The catalyst layers are about ¼ inch thick, thus leaving an empty space about 3 inches high and 6 inches wide for distribution of the radiant heat. Natural gas and steam enter the reaction spaces through conduits 18 in regulated amounts and are forced through the catalyst layers, where the reaction takes place. Water-gas leaves the reaction chambers through conduits 19. The heat necessary for the reaction is furnished by radiation from or through the inner jackets 20 of cylindrical form built of heat-resistant steel and suspended from the top (mechanical details of suspension, not shown, may be according to accepted engineering practice).

Jackets 20 are heated by combustion gases of gas burners 21 to approximately 1000° C. Though the temperatures of the jackets might not be entirely uniform, some degree of auto-regulation of the temperature of the catalyst, due to the different rates of endo-thermic reaction at different temperature levels, may be noticeable: Thus overheating at any point may result in increased reaction velocity, which, due to its endothermic nature, will absorb more heat from the wall.

Additional burners 22 are provided in the channel 23 through which combustion gases pass from the first generator into the second. After passing the second generator, the combustion gases serve to superheat the steam or other feed gases in the preheater 24 and to generate steam in the boiler 25. The heat from the jackets 20 radiates either directly on the catalyst or by reflexion from the insulated outer wall 26. The temperature of the catalyst in this specific example is approximately 800° C. For the temperature of the jacket of 1000° C. and of the catalyst of 800° C. the radiant heat transfer is of the order of 260 Cal./m.$^2 \cdot$ 1°C$\cdot$h. The flame temperature within the jacket may be of the order of 1100–1500° C.

The expansions and contractions of the jackets can regulate automatically the amount of fuel and consequently the temperature of the process.

In accordance with my invention, apparatus can also be constructed capable of operating at various temperatures, e. g. 300° C. to 1200° C. and of resisting pressures of various intensities, and the various reactions, e. g. the dehyrogenation process, can be conducted, if advantageous or necessary, under such temperatures and pressures. Among the known means of reinforcing or of increasing the resistance of the walls against pressures, a suitable method is the welding of the catalyst trays to the heating jacket.

It will be understood that the various apparatus and processes described are merely representative examples and that this invention is not to be limited to the specific details shown and described. It will be observed that certain features and sub-combinations are of utility and may be employed without reference to other features and sub-combinations. This is contemplated by and is within the scope of the invention.

What I claim is:

1. A process for carrying on an endo-thermic catalytic reaction which comprises establishing in a predetermined space an incandescent source of radiant heat adapted to supply the heat requirements of the reaction predominantly by radiation, irradiating with said heat the catalytic surfaces of spaced layers of catalyst arranged in a confined space adjacent said predetermined space, and passing the reactants in gaseous phase over the surfaces thus heated.

2. The process of carrying on an endothermic reaction which comprises passing reactants in a confined annular space over catalytic surfaces of a catalyst arranged in annular layers spaced longitudinally of said confined space, burning fuel at incandescence within the central area defined by said annular confined space and adjacent to the spaces between said layers and segregating the flow of said reactants from the flow of products of combustion from said burning fuel while radiating heat from said burning fuel onto said catalytic surfaces of said layers to supply the heat requirements of said endothermic reaction.

3. The method of converting thermal energy into chemical energy which comprises heating a thermal radiator to incandescence, exposing a catalyst in spaced permeable layers to radiant heat from said radiator, and passing through said layers in the areas thereof which are exposed to said radiant heat reactants which react endothermically by catalytic action on the surface of said catalyst, whereby the radiant heat received on the surface of the catalyst is converted by said reaction into chemical energy in the reaction products.

4. An apparatus for performing endothermic catalytic reactions in the gas phase which comprises a reaction chamber provided with trays, each provided with a layer of catalyst and spaced apart to leave a substantial free space over each layer unobstructed for passage of radiant heat, an enclosing wall for said chamber extending across the edges of said trays and said free spaces, and means outside said space for producing radiant heat at incandescence, positioned to irradiate the surfaces of said layers through said free spaces, whereby to supply the heat requirements of the endothermic reaction predominantly by radiation.

5. An apparatus for performing endothermic catalytic reactions in the gas phase which comprises an annular reaction chamber provided with spaced perforate trays, layers of catalyst on said trays, the spacing of the trays being substantially wider than the thickness of said layers whereby to leave a substantial free space over each layer unobstructed for passage of radiant heat, an inner tubular wall of said chamber extending across the edges of said trays and said free spaces and means for heating said wall to incandescence whereby to irradiate the surfaces of said layers through said free spaces, and thus to supply the heat requirements of the endothermic reaction predominantly by radiation.

6. An apparatus for performing endothermic catalytic reactions in the gas phase which comprises an annular reaction chamber provided with spaced perforate trays, layers of catalyst on said trays, the spacing of the trays being substantially wider than the thickness of said layers whereby to leave a substantial free space over each layer unobstructed for passage of radiant heat, an inner tubular wall for said chamber of a material which transmits radiant heat, extending across the edges of said trays and said free spaces, and an incandescent source of radiant heat within the central space of said tubular wall whereby to irradiate the surfaces of said layers through said wall and said free spaces and thus to supply the heat requirements of the endothermic reaction predominantly by radiation.

7. An apparatus as defined in claim 4 in which the means for producing radiant heat is a fuel burner and a flue for leading products of combustion of said fuel consisting, at least in part, of said enclosing wall, and the trays are spaced more closely together nearer the hottest zone of said burner and farther apart as the distance from said hottest zone increases.

ROMAN WITKIEWICZ.